United States Patent [19]
Vincent

[11] 3,944,285
[45] Mar. 16, 1976

[54] WHEEL SAFETY LOCK
[76] Inventor: Gerald Vincent, Nampa, Idaho
[22] Filed: May 23, 1973
[21] Appl. No.: 363,208

[52] U.S. Cl............. 301/9 DN; 301/108 S; 403/258
[51] Int. Cl............................................. B60b 3/16
[58] Field of Search........... 301/9 DN, 36 R, 37 AT, 301/108 S, 108 SC, 122, 105 R, 1; 403/258, 259, 260, 261

[56] References Cited
UNITED STATES PATENTS

| | | | |
|---|---|---|---|
| 1,707,458 | 4/1929 | Clench | 301/9 DH |
| 2,317,070 | 4/1943 | Tourneau | 403/259 |
| 2,398,349 | 4/1946 | Ash | 301/36 A |
| 2,619,389 | 11/1952 | James | 301/9 DN |
| 3,521,349 | 7/1970 | Gehring | 403/258 |

Primary Examiner—M. Henson Wood, Jr.
Assistant Examiner—Victor N. Sakran
Attorney, Agent, or Firm—John W. Kraft

[57] ABSTRACT

The wheel safety lock comprises a hollow hub cylinder which is engagable on to a wheel hub, a diameter web and means disposed on the wheel lock for retaining the hub cylinder on a wheel hub. Means for locking the hub cylinder to a wheel hub include holes in the diameter web through which fasteners may be engaged into the wheel hub, threads on the interior terminal sidewalls of the cylinder hub, and a mechanically actuated diameter web assembly having movable lug arms which are engagable with recesses in a wheel hub.

4 Claims, 5 Drawing Figures

WHEEL SAFETY LOCK

FIELD OF INVENTION

The present invention relates to means for locking a wheel to a hub, and more particularly to auxiliary means for locking a wheel to a hub.

DESCRIPTION OF THE PRIOR ART

Means for locking a wheel to a hub or particularly a motor vehicle has included bolts, threaded wheel locks, and compression locks. Bolts are intended to be disposed through holes in the wheel into a wheel mount member which is in turn fastened to the hub. Threaded and compressible locking means includes various disks and nuts, referred to as 'knock-offs,' which again engage wheel mounts which are in turn fastened to the axle or hub. These are generally not suitable for high load, heavey duty uses, such as for heavy transport vehicles. This has generally been the case because they depend on a wheel mount for their inevitable support. They also may be difficult to install, and may not properly engage thus failing even though skill and due care have been employed.

Accordingly, it is an object of the present invention to provide an auxiliary means for locking wheels to a hub, and more particularly to an auxiliary locking means for heavy duty wheel loads, such as for motor transport vehicles.

It is a further object that the auxiliary locking means of this invention be fastened by simple bolts.

It is a further object of this invention that the auxiliary locking means of this invention be fastened by threadable locking means between the auxiliary lock of this invention and a wheel hub.

It is a further object of this invention that the auxiliary locking means of this invention be fastened by mechanically actuated lug locking means.

It is a principal object that the auxiliary wheel safety lock of this invention be easily accessible and mechanically simple in its installation and operation on the wheel hub.

These and other objects shall become apparent from the description following, it being understood that modifications may be made without affecting the teachings of the invention here set out.

SUMMARY OF THE INVENTION

The wheel safety lock comprises a hollow hub cylinder which is engagable on to a wheel hub, a diameter web and means disposed on the wheel lock for retaining the hub cylinder on a wheel hub. Means for locking the hub cylinder to a wheel hub include holes in the diameter web through which fasteners may be engaged into the wheel hub, threads on the interior terminal sidewalls of the cylinder hub, and a mechanically actuated diameter web assembly having movable lug arms which are engagable with recesses in a wheel hub.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
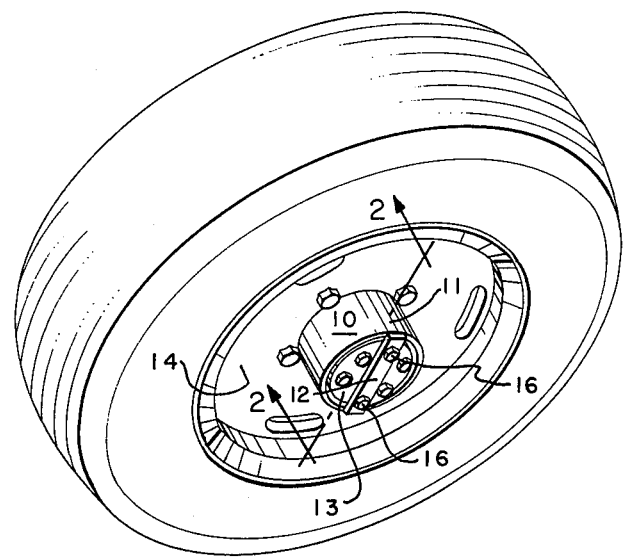
FIG. 1 is a perspective view of the wheel safety lock of this invention shown with a tire and wheel for illustrative purposes.
Figures 2, 3:
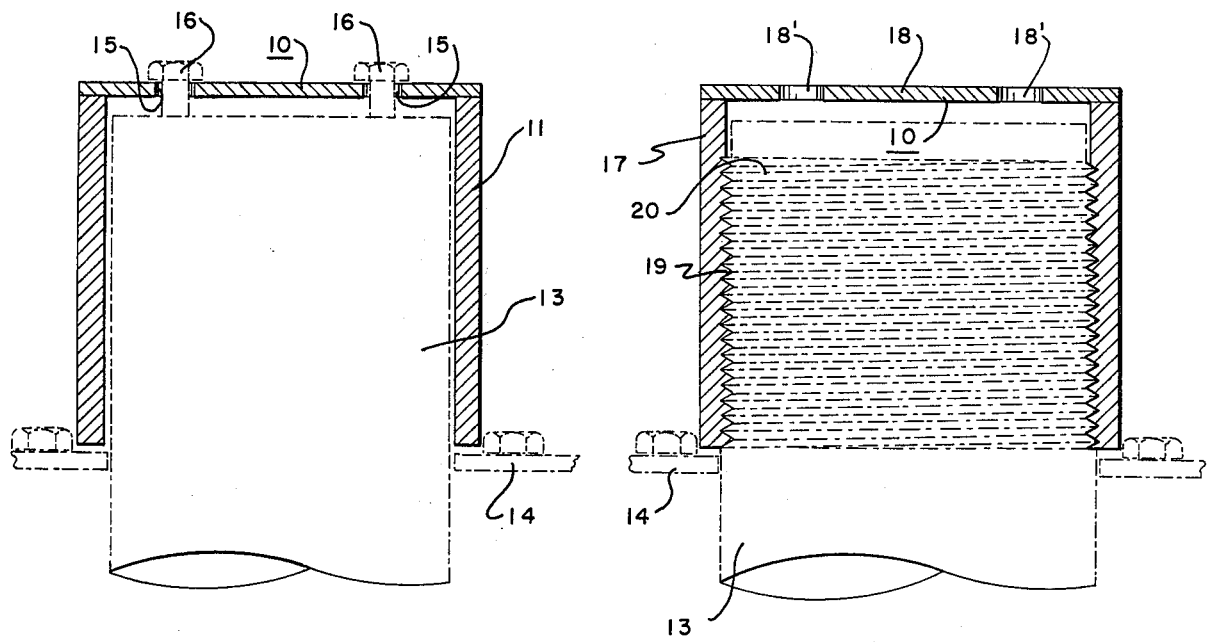
FIG. 2 is a cross-sectional view taken substantially along the lines 2—2 of the FIG. 1 of the wheel safety lock showing the interior configuration of the wheel safety lock on a wheel and hub shown in broken lines for illustrative purposes.
FIG. 3 is a cross-sectional view taken substantially along the lines 2—2 of the FIG. 1 of a further embodiment of the wheel safety lock.

Referring now to the drawings and more particularly to the FIGS. 1 and 2, the wheel safety lock of this invention is shown to advantage and generally identified by the numeral 10. The wheel lock 10 comprises a hub cylinder 11 and a diameter web 12. The hub cylinder 11 is a hollow cylindrical member having an inside diameter substantially equal to the outside diameter of a wheel hub 13. The height of the cylinder 11 is substantially equal to the normal distance by which the hub 13 projects from a wheel 14. The diameter web 12 is suitably fastened across the geometric diameter, at the outermost terminal end of the hub cylinder 11. The diameter web 12 is provided with a pair of holes 15 which are operable to receive bolts 16 which are engagable into the hub 13. In operation, the wheel lock 10 may be demountably installed by engaging the open terminal end of the hub cylinder 11 with the hub 13 and engaging the bolts 16 through the holes 15 into the hub 13. It may be seen that the wheel 14 is restrained from withdrawing from the hub 13 by the compressive force of the interior terminal end of the hub cylinder 11 on the wheel 14.

Referring to the FIG. 3, a further embodiment of the wheel safety lock 10 includes a hub cylinder 17, and a diameter web 18. The hub cylinder 17 is a hollow cylindrical member provided with threads 19 on its interior terminal sidewalls. The hub 13 is likewise provided with threads 20. In operation, the wheel safety lock 10 of the further embodiment may be demountably installed by threadably engaging the hub cylinder 17 onto the hub 13 until either the threads 19 and 20 are fully engaged, or the interior terminal end of the threaded hub cylinder 17 compressively contacts the wheel 14 with such force that the hub cylinder 17 and wheel 14 are secured on the hub 13. The diameter web 18 is fastened in a manner or similar to that of the diameter web 12, across the geometrical diameter at the outermost terminal end of the hub cylinder 17, and includes a pair of fastener receiving holes 18'. In operation, the diameter web 18 may be used to engage the threaded hub cylinder 17 onto the threaded hub 13. Fasteners (not shown) may be engaged through the holes 18' in the manner of the bolts 16 through the holes 15 of the hub cylinder 11. It is to be understood that a satisfactory wheel lock 10 may be fabricated having only a threaded hub cylinder 17.

Figure 4:
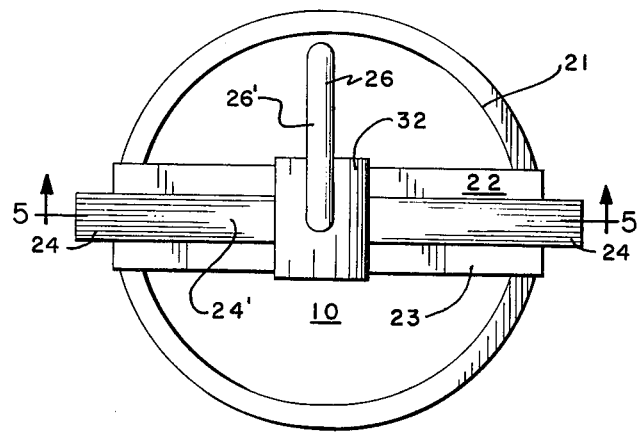
FIG. 4 is a top plan of a further embodiment of the wheel safety lock.
Figure 5:
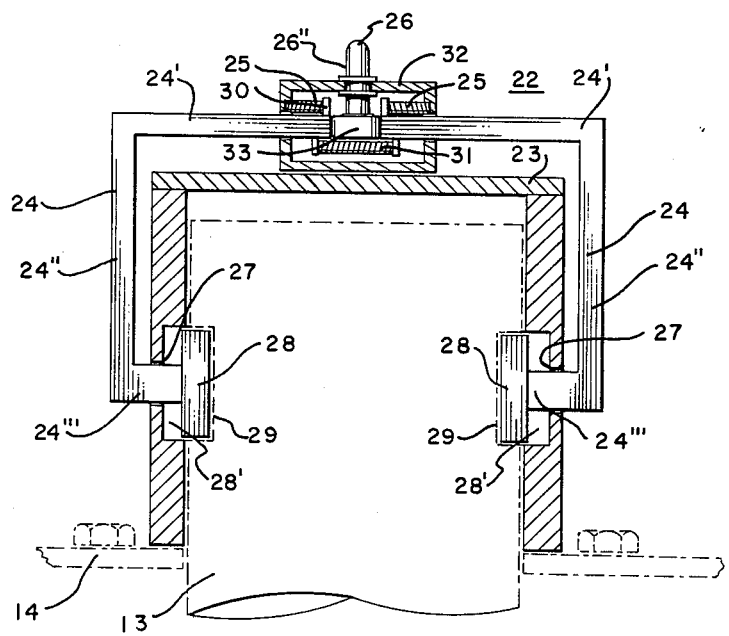
FIG. 5 is a cross-sectional view of the apparatus of the FIG. 4 taken along the lines 5—5 of the FIG. 4, shown mounted on a wheel and hub in broken lines for illustrative purposes.

Referring now to the FIGS. 4 and 5, another embodiment of the wheel lock 10 comprises a hub cylinder 21 and a diameter web assembly 22. The hub cylinder 21 is a hollow cylindrical member whose interior diameter is substantially equal to the outside diameter of the hub 13. The hub cylinder 12 may be provided at one of its terminal ends with a reenforcing web 23. The diameter web assembly 22 includes a pair of opposingly disposed locking arms 24, urging means such as a coil spring 25, and an arm actuator 26. Each of the locking arms 24 is a substantially L-shaped member having a spacing portion 24' disposed distally and parallely above the terminal end having the web 23 of the hub cylinder 21, a height spacing leg portion 24'' which is disposed perpendicularly at the outermost terminal ends of the portion 24' parallelly along the outermost terminal end of the hub cylinder 22, and a lug portion 24''' which is disposed centrally from the terminal ends opposite the portion 24' of the portion 24''. The lug portion 24''' projects through slotted holes 27 provided in the hub cylinder 21, and carries an upstanding lug block 28 at its interior terminal end. The hub 13 is provided distally from its outer terminal end with opposingly disposed recesses 29 which are operable to receive one of the lug block 28. It is to be understood that a recessed ring could be provided and be operably as efficient as opposingly disposed recesses 29. The locking arms 24 are urged centrally together by the urging spring 25. The urging spring 25 is mounted on upstandingly fastened capstan 30 on the uppermost terminal sides on the interior terminal ends of the portion 24'. Additionally, balancing centrally directed urging force may be provided by an identical urging spring 31 mounted on portions of the capstan 30 which may project from the lowermost terminal side of the portions 24'. The lever arms 24 may be selectively forced apart by the arm actuator 26. The lever actuator 26 is a member having a handle portion 26' which is disposed parallel to the terminal end of the hub cylinder 21, an upstanding shaft portion 26'' which is journally carried in a housing 32, and a cam portion 26'' which is journally carried in a housing 32, and a cam portion 33 disposed between the interior terminal ends of the portions 24' of the arms 24 at the lowermost terminal end of the shaft portion 26'' opposite the handle 26'. The cam portion 33 may have any number of cam configurations including a rectangular configuration. The housing 32 may be carried by the arms 24, or be fastened to the reenforcing web 23. The housing 32 may also be extended about the springs 25 and 31 to protect the springs 25 and 31 and the cam 33 from dirt and impact. In operations, the wheel lock 10 may be installed by displacing the arms 24 apart, slidably engaging the hub cylinder 21 onto the hub 13 and actuating the cam 33 by means of the handle 26' to engage the blocks 28 on the arms 24 into the recesses 29 of the hub 13. The wheel lock 10 may be removed conversely, by displacing the arms apart by rotating the handle 26' to cam the arms 24 apart and withdrawing the hub cylinder 21 from the hub 13. It has been found to advantage to provide recess portions 28' in the hub 21 into which to receive the lug block 28.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A wheel safety lock, comprising: a hollow hub cylinder being engagable with a wheel hub; a diameter web fastened at one of the terminal ends of
    said wheel hub; and
    a camming actuator means, said camming actuator means for demountably retaining said hub cylinder on said wheel hub including opposingly disposed arms having at one of their terminal ends lug blocks engagable with recesses in said hub at one of their terminal ends, means disposed at the ends opposite said blocks for urging on said arms for urging said arms centrally together, and actuator means for selectively forcing said arms apart.

2. The wheel safety lock of claim 1 wherein said camming actuator means includes a rectangular cam disposed between the interior terminal ends opposite said blocks of said arms and an actuator handle fastened to said cam.

3. The wheel safety lock of claim 1 wherein said means for urging said arms centrally together, and said cam and said handle is journally carried by a housing.

4. The wheel safety lock of claim 1 wherein said means for urging arms centrally together is a coil spring fastened between upstanding capstans in each of the respective arms at the terminal ends opposite said blocks.

* * * * *